US008312367B2

(12) United States Patent
Foster

(10) Patent No.: US 8,312,367 B2
(45) Date of Patent: Nov. 13, 2012

(54) TECHNIQUE FOR DYNAMICALLY SIZING COLUMNS IN A TABLE

(75) Inventor: William K. Foster, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 424 days.

(21) Appl. No.: 12/610,222

(22) Filed: Oct. 30, 2009

(65) Prior Publication Data

US 2011/0107196 A1    May 5, 2011

(51) Int. Cl.
*G06F 17/00*    (2006.01)
(52) U.S. Cl. ........................................... 715/227
(58) Field of Classification Search .................. 715/227, 715/228
See application file for complete search history.

(56) References Cited

U.S. PATENT DOCUMENTS

| | | | |
|---|---|---|---|
| 5,588,099 A * | 12/1996 | Mogilevsky et al. | 715/273 |
| 7,447,987 B2 * | 11/2008 | Sauermann | 715/212 |
| 7,581,169 B2 * | 8/2009 | Thomson et al. | 715/223 |
| 7,657,830 B2 * | 2/2010 | Ovetchkine et al. | 715/217 |
| 7,725,815 B2 * | 5/2010 | Peters | 715/227 |
| 7,890,852 B2 * | 2/2011 | Wason | 715/234 |
| 2003/0135480 A1 * | 7/2003 | Van Arsdale et al. | 707/1 |
| 2004/0143788 A1 * | 7/2004 | Aureglia et al. | 715/503 |
| 2004/0153966 A1 * | 8/2004 | Richmond et al. | 715/509 |
| 2006/0031754 A1 * | 2/2006 | Lehenbauer et al. | 715/510 |
| 2006/0150078 A1 * | 7/2006 | Brookler et al. | 715/509 |
| 2007/0136655 A1 * | 6/2007 | Peters | 715/509 |
| 2008/0028290 A1 * | 1/2008 | Suwiryo | 715/227 |
| 2008/0098053 A1 * | 4/2008 | Miao et al. | 707/205 |
| 2008/0148113 A1 * | 6/2008 | Ko | 714/710 |
| 2009/0083614 A1 * | 3/2009 | Wedekind | 715/217 |
| 2009/0089662 A1 * | 4/2009 | Wulkan et al. | 715/245 |
| 2010/0268773 A1 * | 10/2010 | Hunt et al. | 709/203 |
| 2010/0299587 A1 * | 11/2010 | Swett | 715/227 |
| 2011/0289398 A1 * | 11/2011 | Chin | 715/227 |
| 2012/0159303 A1 * | 6/2012 | Friedrich et al. | 715/227 |

OTHER PUBLICATIONS

Goldberg et al., Evaluating User Expectations for Widescreen Content Layout, Google 2007, pp. 1-8.*
Sudarsan et al., Efficient Multidimensional Data Redistribution for Resizable Parallel Computations, Google 2007, pp. 182-194.*
Burns et al., FXplore: Exploration of Computed Software Behavior a New Approach to Understanding and Verification, IEEE 2009, pp. 1-10.*

* cited by examiner

*Primary Examiner* — Cong-Lac Huynh
(74) *Attorney, Agent, or Firm* — Park, Vaughan, Fleming & Dowler LLP; Laxman Sahasrabuddhe

(57) ABSTRACT

During a technique for dynamically determining sizes of columns in a table, available space in the table is allocated based at least on sequential groups of size targets, which include ranges of sizes of the columns, and which are associated with visual usability targets for the columns. Note that a given size target in a given group of size targets includes a given range of sizes of a given column. For example, minimum sizes of the columns may correspond to the ranges of sizes of one or more of the groups in the sequential groups of size targets for which the columns satisfy the associated visual usability targets. Furthermore, for a subsequent group of size targets in the sequential groups of size targets after the one or more groups, increments to the minimum sizes of the columns may be calculated based at least on the range of sizes of the subsequent group of size targets, the available space and the minimum sizes.

24 Claims, 5 Drawing Sheets

| COLUMN | MINIMUM | MINIMUM SPAN | IDEAL | IDEAL SPAN | ACTIVATED IDEAL | ACTIVATED IDEAL SPAN | MAXIMUM |
|---|---|---|---|---|---|---|---|
| A | 1 | 10 | 11 | 0 | 11 | 0 | 11 |
| B | 1 | 10 | 11 | 3 | 14 | 3 | 17 |
| C | 1 | 5 | 6 | 3 | 9 | 9 | 18 |
| D | 1 | 5 | 6 | 0 | 6 | 3 | 9 |
| E | 1 | 20 | 21 | 6 | 27 | 3 | 30 |
| TOTAL | 5 | 50 | 55 | 12 | 67 | 18 | 85 |

GROUPS OF SIZE TARGETS 300

FIG. 3

TECHNIQUE FOR DYNAMICALLY SIZING COLUMNS IN A TABLE

BACKGROUND

1. Field

This disclosure generally relates to displaying information in tables. More specifically, this invention relates to a technique for dynamically sizing columns in a table.

2. Related Art

Graphical user interfaces (GUIs) are widely used in software applications to present information to users, and to receive user inputs. For example, a table in a dialog box or window in a GUI may include multiple fields or cells, which present information and/or which receive user inputs.

However, there is a limited amount of real estate or space in a display, which constrains the size of a table displayed in the GUI. For example, if there is a central window in a GUI that is used to display a circuit design, the widths (or heights) of tables displayed in windows to the left and right of the central window (or above and below the central window) are typically restricted.

Furthermore, the amount of information usually varies from cell to cell in the table. For example, some of the cells may include long sequences of text, while others may have shorter sequences. It is often difficult to allocate the available space or size of the table among the columns of the table. If the longest sequence is used to determine the column sizes, many of the columns will be too wide, and the table will occupy too much real estate in the GUI. Alternatively, if all of the columns are assigned a fixed width, many of the sequences will need to be truncated. This may make it difficult for a user to understand the residual text information that is displayed.

All of these challenges are compounded in applications where the user interacts with the GUI. For example, the user may selectively change the width of the table or a specific column. If this occurs, the widths of the remaining columns will also need to be modified. Consequently, dynamically determining column sizes in a table remains a challenge in GUIs, which adversely impacts: the user experience, the usefulness of software, and thus software sales and customer retention.

SUMMARY

One embodiment of the present disclosure provides a computer system that determines column (for row) sizes in a table. During operation, the computer system receives a set of columns (such as an ordered set of columns) currently displayed in the table and a size of the table in a direction. Furthermore, the computer system receives sequential groups of size targets that correspond to visual usability targets for the ordered set of columns, where a given group of size targets includes ranges of sizes ordered to correspond to the ordered set of columns based at least on the visual usability targets for the ordered set of columns. Note that a given size target in a given group of size targets includes a given range of sizes of a given column in the ordered set of columns. For example, the given range of sizes may ensure that all or an interesting subset of the cells in the given column satisfy the associated visual usability target. Then, the computer system determines minimum sizes corresponding to the ordered set of columns based at least on the size of the table and the sequential groups of size targets, where the minimum sizes are the maximum values in the ranges of sizes of one or more of the groups in the sequential groups of size targets for which the ordered set of columns satisfy the associated visual usability targets. (Thus, there may be one minimum size per column, and the minimum size for a column may be based on the visual usability targets for that column.) Additionally, for a subsequent group of size targets in the sequential groups of size targets after the one or more groups, the computer system calculates increments to the minimum sizes of the sets of columns based at least on the range of sizes of the subsequent group of size targets, the size of the table and the minimum sizes, thereby allocating the size of the table to the ordered set of columns.

Note that the direction may be a horizontal direction, and the size of the table may be a width of the columns. Alternatively, the direction may be a vertical direction, and the size of the table may be a height of the rows. In addition, note that the cells in the columns may include textual objects or graphical objects.

In some embodiments, the size of the table is specified by a user. Moreover, if the user modifies the size of the table, the computer system may dynamically repeat the determining of the minimum sizes and the calculating of the increments.

Furthermore, an increment for the given column may correspond to the given range of sizes times a ratio of a first difference to a second difference, where the second difference is between a sum of the maximum values in the range of sizes of a current group of size targets and a sum of the minimum sizes in the range of sizes of the subsequent group of size targets, and where the first difference is between the size of the table and a sum of the minimum sizes of the set of columns.

Additionally, a range of sizes corresponding to the set of columns in a group of size targets that is between two immediately adjacent groups of sizes targets in the sequential groups of size targets may ensure that cells in the set of columns that are within a statistical criterion achieve an associated visual usability target of a subsequent adjacent group of size targets. For example, the statistical criterion may correspond to a standard deviation of the range of sizes of a usability target of the cells within a column for each column of the ordered set of columns in the group of size targets.

In some embodiments, the computer system receives a user instruction to expand (or contract) the given column. For example, the user instruction may include one or more mouse clicks performed in or proximate to the given column. In response, the computer system may increase (or decrease) a size of the given column beyond an initial size (which equals a sum of a minimum size and an increment for the given column), based at least on a maximum value (or a minimum value) in a range of sizes of the given column in a subsequent (or prior) group of size targets. After the increase (or decrease), the size of the given column may equal the maximum (or the minimum) in the range of sizes of the given column in the subsequent (or prior) group of size targets. Furthermore, the computer system may decrease (or increase) the sizes of remaining columns in the ordered set of columns from their initial sizes (which equal a sum of the minimum sizes and the corresponding increments for the remaining columns) based at least on the increase (or decrease) in the size of the given column and/or the range of sizes of the remaining columns in the subsequent (or prior) group of size targets. Note that these operations can also be thought of as adjusting the size targets such that the dragged to value is the natural consequence of the technique.

Subsequently, the computer system may receive a second user instruction to restore the initial size of the given column. For example, the second user instruction may include one or more mouse clicks performed in or proximate to the given column. In response, the computer system may decrease (or increase) the size of the given column back to the initial size, and may increase (or decrease) the sizes of remaining columns in the ordered set of columns back to their initial sizes.

In some embodiments, the computer system receives a third user instruction to modify a size of the given column from an initial size (which equals a sum of a minimum size and an increment for the given column). Then, the computer system receives a new size of the table from the user. Next, the computer system dynamically resizes the columns in the table based at least on initial sizes of the columns (which equal the sum of the minimum sizes and the corresponding increments for the columns), the new size of the table, the sequential groups of size targets, and/or the modified size of the given column.

Another embodiment provides a method including at least some of the above-described operations.

Another embodiment provides a computer-program product (such as the computer software) for use in conjunction with the computer system.

BRIEF DESCRIPTION OF THE FIGURES

FIG. 3 is drawing illustrating groups of size targets in accordance with an embodiment of the present disclosure.

Figure 1:
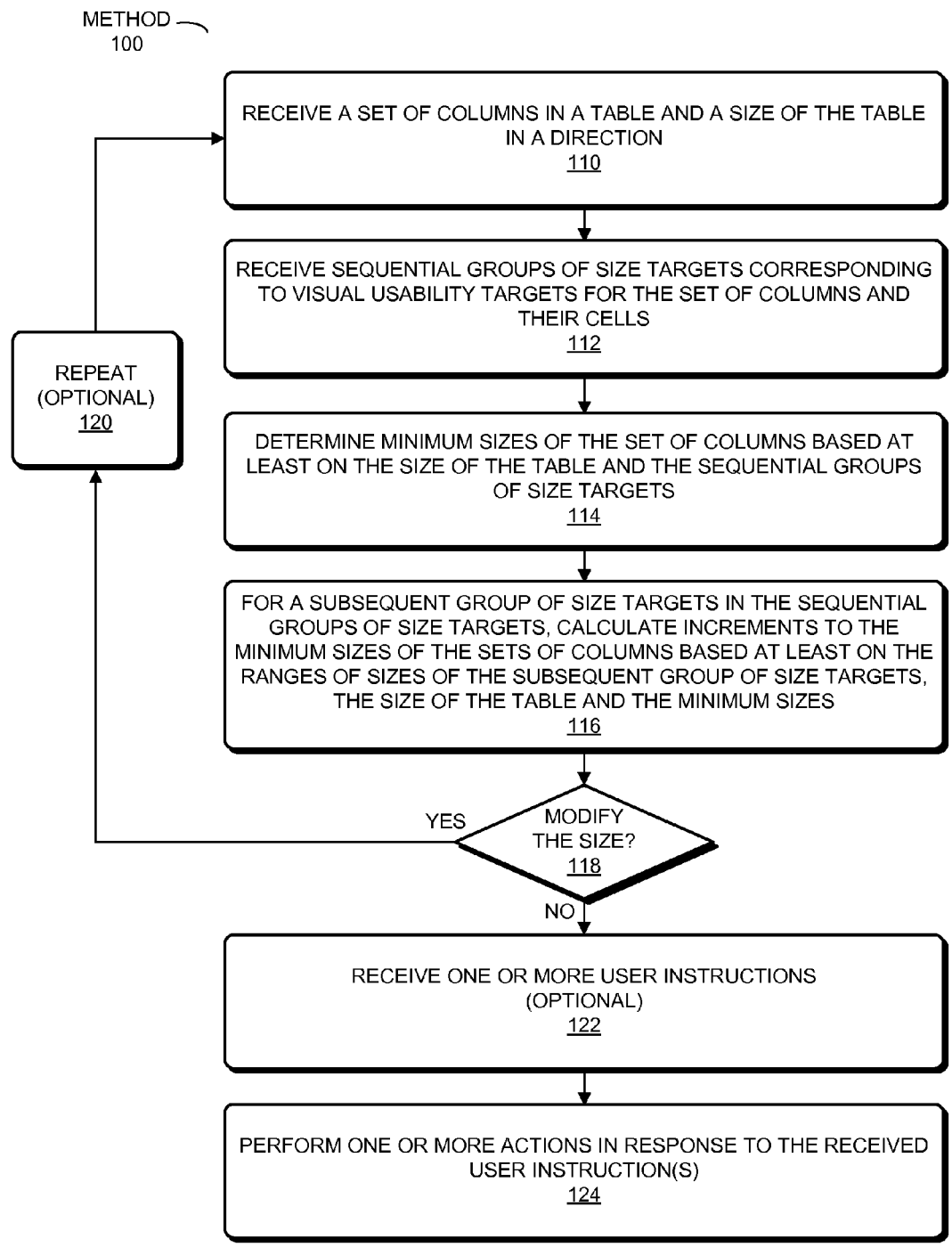
FIG. 1 is a flowchart illustrating a method for determining column sizes in a table in accordance with an embodiment of the present disclosure.

Table 1 provides visual usability targets and associated criteria for an ordered set of columns in a table in accordance with an embodiment of the present disclosure. Table 2 provides pseudo-code with operations in the methods of FIGS. 1 and 2 in accordance with an embodiment of the present disclosure.

Note that like reference numerals refer to corresponding parts throughout the drawings. Moreover, multiple instances of the same type of part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, a method, and a computer-program product (i.e., software) for use with the computer system are described. This method dynamically determines sizes of columns (or rows) in a table. In particular, during the method available space in the table is allocated based at least on sequential groups of size targets, which include ranges of sizes of the columns, and which are associated with visual usability targets for the columns. Note that a given size target in a given group of size targets includes a given range of sizes of a given column. For example, minimum sizes of the columns may correspond to the ranges of sizes of one or more of the groups in the sequential groups of size targets for which the columns and its cells satisfy the associated visual usability targets. Furthermore, for a subsequent group of size targets in the sequential groups of size targets after the one or more groups, increments to the minimum sizes of the columns may be calculated based at least on the range of sizes of the subsequent group of size targets, the available space and the minimum sizes.

By dynamically determining the sizes of columns in a table, this allocation technique can improve the quality of the visual information displayed to a user, and thus can improve the usefulness of software that includes or displays tables. Consequently, the allocation technique can improve the overall user experience, which can: increase customer retention, improve sales of the software, and thus can increase the profitability of the developer of the software.

As an illustrative example, in the discussion that follows the allocation technique is applied to tables (or windows) in a graphical user interface (GUI), such as a GUI associated with electronic-design-automation (EDA) software. However, this technique may be used in conjunction with a wide variety of software, including: software applications (such as text editors, spreadsheet applications and/or presentation software), software development tools, firmware, operating systems and/or software testing tools.

We now describe embodiments of a technique for determining column sizes in a table. FIG. 1 presents a flowchart illustrating a method 100 for determining column sizes in a table, which may be performed by a computer system (such as computer system 400 in FIG. 4). During operation, the computer system receives a set of columns (such as the ordered set of columns) or rows currently displayed in the table and a size of the table in a direction (operation 110). Furthermore, the computer system receives sequential groups of size targets corresponding to visual usability targets for the set of columns and their cells (operation 112), where a given group of size targets includes ranges of sizes of the set of columns based at least on the visual usability targets for the set of columns. Note that a given size target in a given group of size targets includes a given range of sizes of a given column in the set of columns. Then, the computer system determines minimum sizes of the set of columns based at least on the size of the table and the sequential groups of size targets (operation 114), where the minimum sizes are the maximum values in the ranges of sizes of zero or more of the contiguous groups from the beginning of the sequential groups of size targets for which the set of columns satisfy the associated visual usability targets. (Note that in the case of zero contiguous groups, the minimum size is the minimum of the range of the first group. Alternatively, the first group has a span of zero to the minimum size, and the range includes at least one group.) Additionally, for the subsequent group of size targets in the sequential groups of size targets after the zero or more groups, the computer system calculates increments to the minimum sizes of the sets of columns based at least on the range of sizes of the subsequent group of size targets, the size of the table and the minimum sizes (operation 116), thereby allocating the size of the table across the set of columns.

Note that the direction may be a horizontal direction, and the size of the table may be a width, and column sizes may be controlled. Alternatively, the direction may be a vertical direction, the size of the table may be a height, and row sizes may be controlled. In addition, note that the individual cells in the columns may include textual objects or graphical objects (such as pop-up windows or radio buttons).

In some embodiments, the size of the table is specified by a user. Moreover, if the user modifies the size of the table (operation 118), the computer system may optionally dynamically repeat (operation 120) the determining of the minimum sizes and the calculating of the increments.

In some embodiments, the computer system optionally receives one or more user instructions (operation 122), and in response the computer system optionally performs one or more actions (operation 124). For example, the user instruction may be to expand (or shrink) a column (as indicated by one or more mouse clicks performed in or proximate to the given column or row). In response, the computer system may optionally increase (or decrease) a size of the given column beyond an initial size (which equals a sum of a minimum size and an increment for the given column) based at least on a maximum (or minimum) value in a range of sizes of the given column in a subsequent (or prior) group of size targets. After the increase (or decrease), the size of the given column (or row) may equal the maximum (or minimum) in the range of sizes of the given column in the subsequent (or prior) group of size targets. Furthermore, the computer system may optionally decrease (or increase) the sizes of remaining columns (or rows) in the set of columns from their initial sizes (which equal a sum of the minimum sizes and the corresponding increments for the remaining columns) based at least on the increase (or decrease) in the size of the given column and/or the range of sizes of the remaining columns (or rows) in the subsequent (or prior) group of size targets.

Subsequently, the computer system may optionally receive a second user instruction to restore the initial size of the given column. For example, the second user instruction may include one or more mouse clicks performed in or proximate to the given column. In response, the computer system may optionally decrease (or increase) the size of the given column (or row) back to the initial size, and may optionally increase (or decrease) the sizes of remaining columns (or rows) in the set of columns back to their initial sizes.

Alternatively, the user instruction may modify a size of the given column (or row) from an initial size, which equals the sum of a minimum size and the increment for the given column. Furthermore, the computer system may optionally receive a new size of the table from the user. In response, the computer system may optionally dynamically resize the columns (or rows) in the table based at least on initial sizes of the columns (which equal the sum of the minimum sizes and the corresponding increments for the columns), the new size of the table, the sequential groups of size targets, and/or the modified size of the given column.

Figure 2:
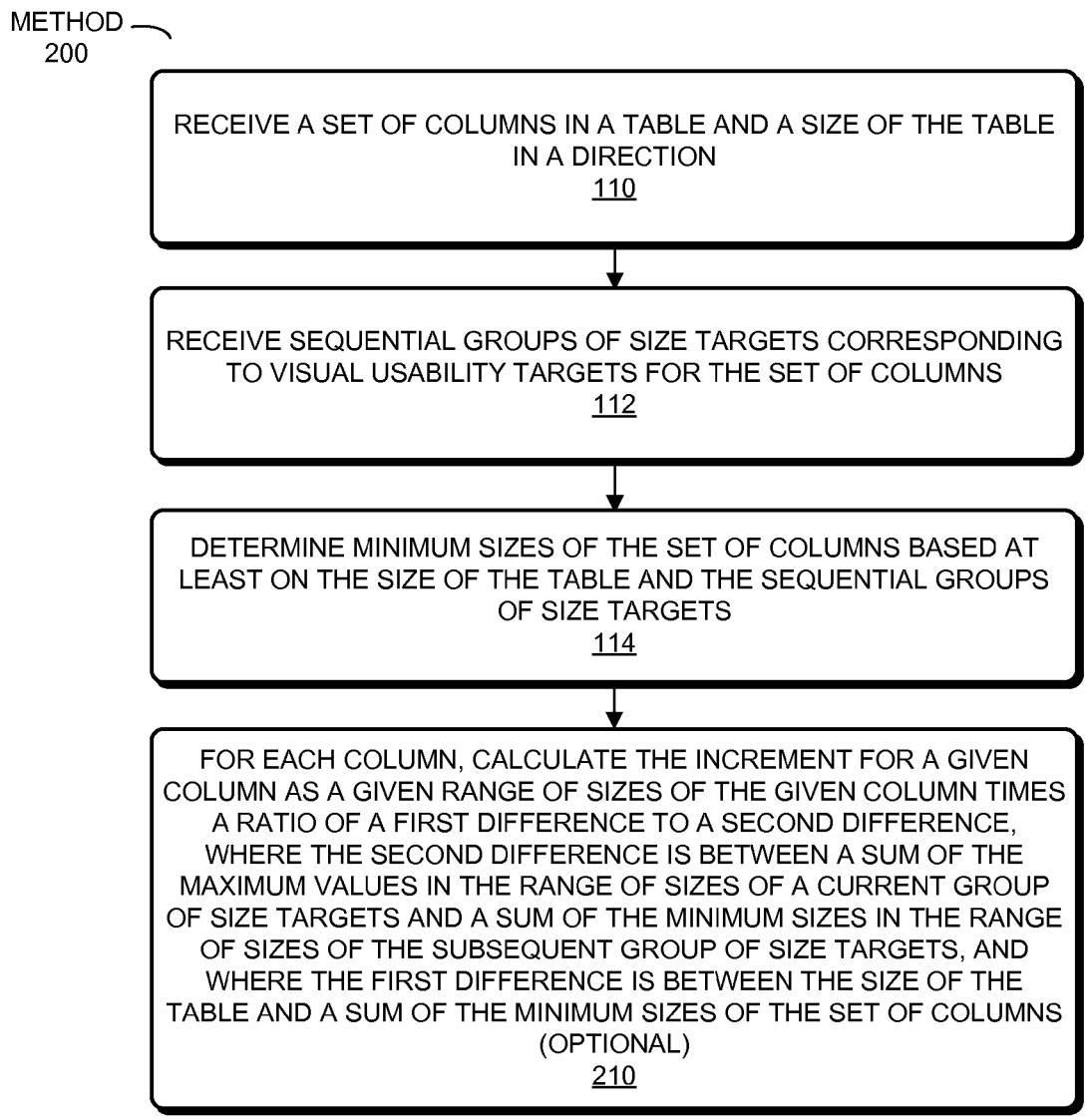
FIG. 2 is a flowchart illustrating a method for determining column sizes in a table in accordance with an embodiment of the present disclosure.
Figure 4:
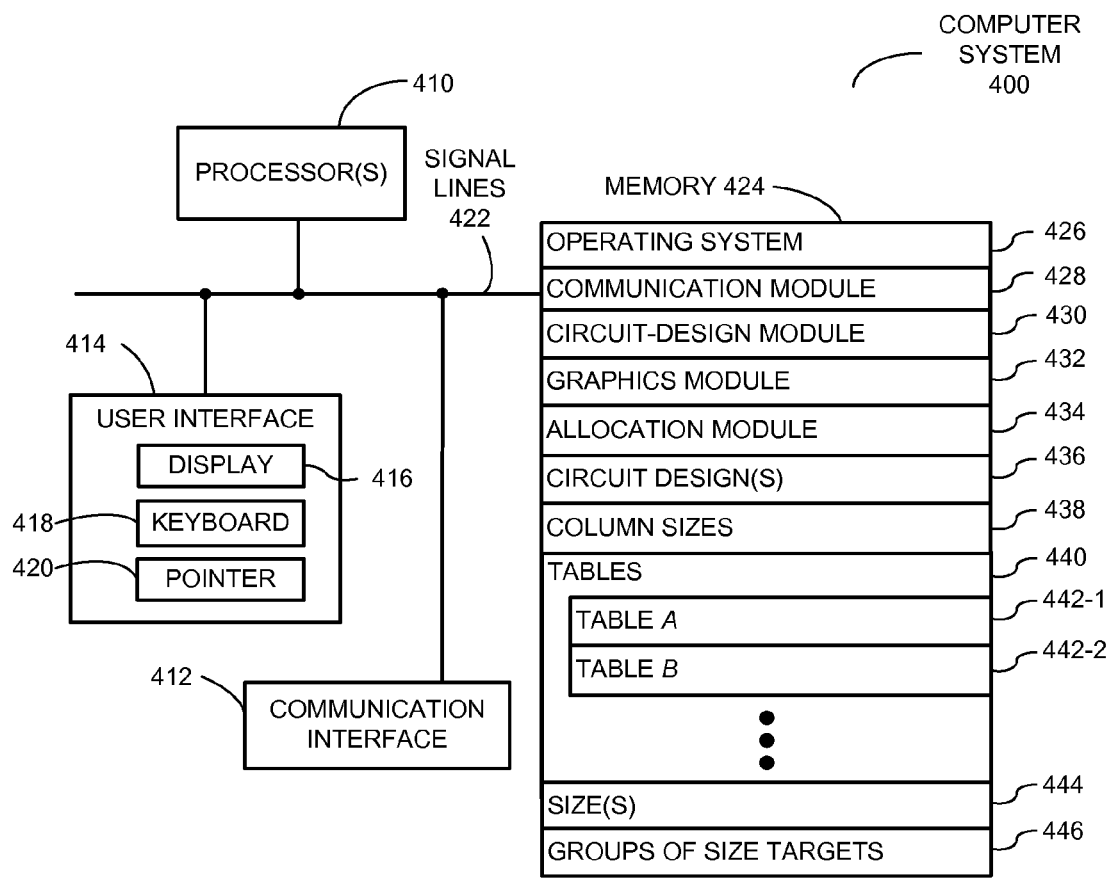
FIG. 4 is a block diagram illustrating a computer system that performs the method of FIG. 1 or FIG. 2 in accordance with an embodiment of the present disclosure.

Another embodiment of several of the operations in method 100 is shown in FIG. 2, which presents a flowchart illustrating a method 200 for determining column sizes in a table that may be performed by a computer system (such as computer system 400 in FIG. 4).

After receiving the set of columns in the table and the size of the table in the direction (operation 110), and receiving the sequential groups of size targets corresponding to visual usability targets for the set of columns (operation 112), the computer system determines the minimum sizes of the set of columns based at least on the size of the table and the sequential groups of size targets (operation 114). For example, the size of the table may be wide enough that the minimum size of each of the columns in the set of columns can altogether satisfy the maximum size (such as 67 pixels or characters) in the range of sizes associated with the third group of size targets (i.e., the sum of the maximums for each range of sizes in the third group may be less than the available table width whereas this cannot be satisfied with the fourth group). Thus, the last group in the sequential groups of size targets whose maximum sizes can all be satisfied by the current table width may be selected.

Then, for each column in the set of columns, the computer system optionally calculates the increment for the given column, which may correspond to the given range of sizes times a ratio of a first difference to second difference, where the second difference is between a sum of the maximum values in the range of sizes of the current group of size targets and a sum of the minimum sizes in the range of sizes of the subsequent group of size targets (operation 210), and where the first difference is between the size of the table and a sum of the minimum sizes of the set of columns. For example, if the table width is 79 and the sum of the minimums of the columns is 67, then the first difference may be 12, and the fourth group of size targets may have a sum of the column's maximum sizes of 85 pixels or characters (i.e., the second difference is 18 because 85 is 18 larger than the maximum size in the range of sizes associated with the third group of size targets or 67). Furthermore, the range of sizes or the span associated with a given column may be 3. Consequently, the increment for the given column may be 12/18 times 3, or a column increment of 2. If that column's minimum is 27 (out of 67 for all the columns), the size may be 27 +2 (out of 12 for all the columns), or 29 (out of 79 for all the columns).

Additionally, a range of sizes of the set of columns in a group of size targets that is between two immediately adjacent groups of sizes targets in the sequential groups of size targets may ensure that cells in particular columns within the set of columns that are within a statistical criterion within that column achieve an associated visual usability target corresponding to the subsequent, adjacent group of size targets. For example, the statistical criterion may correspond to one or more standard deviations of visual usability targets of cells of individual columns within the range of sizes of the set of columns in the group of size targets. In particular, the range of sizes of the group of size targets for at least some of the columns may be relaxed (or more stringent) relative to those in the subsequent group of size targets. In this way, if all of the cells within the set of columns cannot achieve the visual usability target (and, thus, the range of sizes) of the subsequent group of size targets, the majority of the cells within each column can achieve the visual usability target (and, thus, the range of sizes) via the group of size targets. This approach allows outliers to be excluded when computing the visual usability target for a column. In addition, it allows the variation in the column sizes to be other than a linear function of the size of the table. (Note that outliers could have a variety of meanings. For example, one could measure the value of a piece of information and allocate less space to columns based upon a lower value, or exclude some cells from the column calculation due to their being less valuable. Moreover, a cell's visual usability target may vary over time, and consequently the allocation may vary over time even if the user takes no action to resize the table or columns.)

In some embodiments of methods 100 (FIG. 1) and 200 there are additional or fewer operations. For example, rows and/or columns in a table may be dynamically sized using method 100 (FIG. 1) and/or 200. Moreover, the order of the operations may be changed and/or two or more operations may be combined into a single operation.

In an exemplary embodiment, the EDA software includes a property editor that is displayed in a GUI. This property editor may be used to view the properties of a selected object in a canvas or central window, which is displayed in the GUI.

Moreover, the property editor may be displayed on one or more windows or tables that are adjacent (either above or below, or to the left or to the right of) the central window, or undocked to the central window.

In the table, the rows may include electrical properties and the columns may include different aspects of a given electrical property, for example, a name, visibility (such as whether the electrical property is annotated on the canvas when it is drawn), etc. Furthermore, the property editor may include different aspects or regions, such as: attributes, parameters, connectivity, etc. In each of these regions, there may be an associated table. Additionally, the entries in the cells of a given table may include text objects (such as alphanumeric information) and/or graphical objects, such as a widget (for example, a pop-up window, a checkbox, a push button, or a series of radio buttons). In contrast with tables in other software applications, a graphical object may be included in one cell (as opposed to being overlaid on multiple cells).

Because at a given time there may be a fixed amount of real estate in the GUI for the property editor, e.g., it may have a current fixed width, the allocation technique may be used to allocate this width to the visible columns in the table(s). As noted previously, the allocation technique allocates the available width based at least on visual usability targets, such that all the columns in the table satisfy a given visual usability target concurrently.

Table 1 provides visual usability targets and criteria for an ordered set of columns in a table or a window. Note that every column in the table has a series of preferred widths, heights or, more generally, ranges of sizes along a direction of the table that are a function of the particular data in the column or row. In the discussion that follows, widths are used as illustrative examples. In addition, note that the visual usability targets may include ranges, where a given range is defined by two adjacent columns.

These visual usability targets and the associated ranges of widths are used to allocate the available total space or width of the table among the columns. In Table 1, the specified visual usability targets are ordered from largest to smallest. Note that, based at least on a given visual usability target, the widths of the columns may be constrained to be at least as large or wide as the widths associated with the subsequent visual usability target that follows it in the table (i.e., the immediately adjacent, smaller visual usability target). Furthermore, note that the pareto visual usability targets (such as "Pareto Maximum") allow the majority of the columns to meet a given visual usability target on a statistical basis (such as ensuring that the majority of the cells meet the visibility target by limiting satisfaction to those cells whose visibility target is within one standard deviation of the given visual usability target of all cells in a given column).

TABLE 1

| Visual Usability Targets | Criteria |
|---|---|
| Maximum | Minimum width necessary to completely display any potential value in its activated state for all the cells in a column across all rows. |
| Pareto Maximum | Maximum activated ideal size of all values potentially portrayed for all the cells in a column having an activated ideal size within one standard deviation of the mean. |
| Activated Ideal | Minimum width necessary to completely display current values for all the cells when in their activated state in a column across all rows. |
| Pareto Activated Ideal | Maximum activated ideal size of all cells in a column having an activated ideal size within one standard deviation of the mean. |
| Ideal | Minimum width necessary to completely display current values for all the cells in a column across all its rows, including the header row where the title is shown. |
| Pareto Ideal | Maximum ideal size (see next entry) of all the cells in a column having an ideal size within one standard deviation of the mean. |
| Minimum | Size required to display the first three characters of the column header together with an ellipsis (. . .) character, but never less than the space required to display a title of "abcd." |

Furthermore, the column widths may be dynamically computed based at least on the particular column headers currently displayed and/or the data currently displayed in the cells of the columns. Whenever a column header title is too long to be completely displayed in the available column space or width, it may be displayed using its initial characters (which are permitted given the available space) followed by an ellipsis. In addition, the "Ideal" and "Activated Ideal" widths may be re-determined each time the information shown in the table changes (such as when a user makes another column, which is associated with an item in a working set, visible in the Table, performs an edit that changes the value displayed in one or more cells, or when viewing time based data and the passing of time results in a new value for a given cell of a column), and the "Maximum" width may be re-determined whenever the potential values in a given column are changed, or when the "Activated Ideal" widths are changed.

When a column is visible (i.e., is displayed), it may have a width that is at least as large as its "Minimum" width and, more generally, no wider than its "Maximum" width. Collectively, the "Minimum" widths of all the visible columns define the minimum width of the table (or the window or a region in the GUI that includes the table). Similarly, the "Maximum" widths of all the visible columns define the maximum width of the table. Therefore, displaying a previously hidden column may adjust the table's overall minimum and maximum widths, and the table's overall width may be increased or decreased if it would be less than the new minimum or greater than the new maximum. Furthermore, a user may not be allowed to resize the table to be smaller than the "Minimum" required for the widths needed by all the visible columns, and may not be allowed to resize the table to be larger than the "Maximum" width allowed by all of the visible columns. These criteria may apply whether or not the table (or the window) is 'docked' or temporarily anchored at a location in the GUI (e.g., if the table is displayed at the location even when a different command or operating mode in the EDA software is selected by the user).

Note that the computed "Minimum" width of a column may be large enough that its truncated column title can be uniquely distinguished from all the other column titles. When a column title is truncated, a tooltip may be enabled to provide the complete column title. However, if the column title already has a tooltip that explains the column, the tooltip may remain unchanged when the title is elided.

If the cumulative "Maximum" width of the columns in a region of the table or the window is less than the cumulative "Maximum" width of the columns in another region, the overall width of the table may be maximally sized for the largest such region. Similarly, when the cumulative "Minimum" width of the columns in a region of the table or the window is less than the cumulative "Minimum" width of the columns in another region, the overall width of the table may be only minimally sized for the largest such region. Moreover, if the maximum width of the table is increased to accommodate the largest region, the width increment for each of the smaller regions may be allocated across the columns in these regions in proportion to their "Maximum" width.

In some embodiments, the window in the GUI is associated with one or more widgets (for example, in different cells in a table) that require more space when they are activated for editing. For example, an "orientation widget" may include three editing buttons when it is activated, and thus its "Activated Ideal" width may be significantly larger than its "Ideal" width (which is computed when these editing buttons are not displayed). Another example is an "LCV widget combo box triple," which has a raised menu arrow on each combo box, and a raised "Library/Cell/View (LCV) selector" dialog button that is only displayed when it is activated. In addition, while some cells may not be directly editable, their annotations, such as bolding, may change depending on other cells in their row in a table. For example, a "Name" column in a parameters region of a table may be displayed in bold when the row has pending edits, and thus its "Activated Ideal" may include the additional space needed to display it in bold.

For combo boxes, the "Maximum" width may account for the longest entry that can be selected. For example, in the case of the cascaded "LCV selector," the complete tree may be searched to find the longest possible library, cell, or view name. For unbounded string editable widgets, such as "Single Line Text Widgets," the "Maximum" width may be the greater of twice the "Ideal" width and 400 pixels or characters. However, for the purpose of computing the "Pareto Maximum" width, cells with unbounded widths may be ignored. Instead, the "Pareto Maximum" width of a given column that includes these cells may be matched to the largest "Pareto Maximum" width of all columns (including the given column). For integer values, the "Maximum" width may be computed from the maximum number of decimal digits that a platform-dependent integer (e.g., 32 bit, 64 bit, 128 bit, etc.) can represent, with each digit being the largest numeral (i.e., a '9'). Similarly, for floating point values, the "Maximum" width may be computed from the maximum precision digits that a platform's floating or double-precision number can hold, once again with each digit being the largest possible numeral.

For all of the visual usability targets in Table 1, note that the ranges of widths may be limited to be no more than 1,600 pixels or characters wide, and the "Ideal" width may always be at least one pixel or character larger than the "Minimum" width.

In some embodiments, whenever a cell in the table or the window is edited, the "Ideal" and the "Activated Ideal" widths for its column may be impacted by the new value in that cell if the new value has a different length than the previous value. In turn, this may impact the maximum-width calculation. However, whenever such adjustment occurs, the column widths may be reallocated to account for the updated values. Without such a reallocation, it would be as if the user had modified (i.e., by dragging) the column width from its new default width to its old default width, and thus had overridden the column-width allocation. Because such overrides are maintained during the life of the table (see below), remembering the implicit override may be an undesirable behavior. As a consequence, the column width may instead be reallocated when the user has finished editing the value in the cell.

Furthermore, whenever the table is sized to exceed its minimum width (as computed based on a sum of the "Minimum" widths of all of the visible columns in the table), the excess width beyond this minimum width may be distributed among the visible columns. This distribution may be proportionate to each column's width span or the range of widths between the different visual usability targets. For example, the first range of widths is between "Minimum" and "Pareto Ideal," followed by the second range of widths between "Pareto Ideal" and "Ideal," etc. (Note that this representation is different from that described previously where the target includes a range of sizes. In this example, the target is a single number, pairs of which define the previous range of sizes.) In this way, as the table grows, space may be added to all the columns such that all the columns reach or achieve the column widths associated with each of the successive visual usability targets together as each successive target is met.

Because of this allocation of table width across its columns, the cumulative width of all the visible columns may match the total width of the table. Consequently, a horizontal scroll bar may not be needed in any of the editing regions or cells of the table or the window.

Note that the user may override the default column widths in a variety of ways. For example, double clicking on the right-hand edge of a column header using a mouse (or a user-interface device) may immediately reset its "Activated Ideal" width back to its original value, and then may resize the column toward its original "Activated Ideal" width (which may be either larger or smaller than the current width of the column). In some embodiments, this calculation is stable so that successive calculations of the new value result in the same value. Furthermore, when the user override (such as the double click) does not change the column width (for example, if the double click is repeated immediately), the column width may instead be toggled back to its default width (i.e., as if the column had never been manually resized).

If a column width is increased in response to the user override, the column widths of the other columns may be commensurately decreased to provide space for the larger column. Similarly, when a column width is decreased in response to the user override, the column widths of the other columns may be commensurately increased to take up the slack from the column being decreased. However, as noted previously, each of the column widths may not be smaller than its "Minimum" width or larger than its "Maximum" width. Thus, the "Activated Ideal" width may not be fully attainable in the current width or space of the table or window. In this case, the column width may be increased or decreased as far as possible toward its "Activated Ideal" width without causing any other column to fall below its "Minimum" width or rise above its "Maximum" width.

In addition to double clicking, the user may also manually drag the right-hand edge of a column to directly manipulate its width. Once again, such dragging may not make any column smaller than its "Minimum" width or wider than its "Maximum" width. As the width of a column is manually decreased, the freed-up space may be distributed across the other visible columns in proportion to the span or range of widths for each column (such as the range of widths between the column's: "Minimum" width and "Ideal" width; "Ideal" width and "Activated Ideal" width; or "Activated Ideal" width and "Maximum" width) based on which of the visual usability targets the column width is currently in.

If manually decreasing the column width provides sufficient space that the other columns reach the largest widths associated with the current visual usability target, then these column widths may continue to be expanded according to the apportionment associated with the next visual usability target. Similarly, as the column width is manually increased, the needed space may be taken from the other visible columns based at least on their spans or ranges of widths for each of the successive visual usability targets. As with double clicking, a column width may not be manually increased to be any larger than the point at which the other columns reach their "Minimum" widths, or manually decreased to be any smaller than the point at which the other columns reach their "Maximum" widths. In some embodiments, the calculations are stable so that, for example, resizing a column to its "Maximum" width on different occasions does not result in different calculated column widths. In this way, the limits on manual resizing can be enforced.

Once a column has been manually resized, the re-calculation of that column's width as the table is resized may be modified to account for the manual resizing. Consequently, this resizing may effectively change the "Ideal" and the "Activated Ideal" widths of the column so that its manually adjusted width results from the normal dynamic sizing calculation based on the current width of the table. Note that the changes to the "Ideal" and the "Activated Ideal" widths of the column may be stored, for example, using the ratio of the original "Ideal" and the "Activated Ideal" widths to the new manually defined values. In this way, any changes to the underlying "Ideal" and "Activated Ideal" width calculation (such as by switching to a different object or editing a value in a column so that it takes more or less space) result in new adjusted "Ideal" and "Activated Ideal" widths by using the stored ratios. Furthermore, manual resizing of one or more columns in the table may be maintained as long as the table or window is open. Thus, the manual resizing of one or more columns in the table may be retained when: the table is hidden or displayed; when the table is docked or undocked; and/or when the user is navigating through a hierarchy that does not support the table.

These aspects of the technique for determining column widths are illustrated in FIG. 3, which presents a drawing illustrating groups of size targets 300 that includes columns having widths that combined incrementally range from: a "Minimum" cumulative width of 5; to an "Ideal" cumulative width of 55; to an "Activated Ideal" cumulative width of 67; and to a "Maximum" cumulative width of 85. Note that each of the individual columns has a minimum width of 1, which together have a cumulative minimum of 5.

Given the current width of a table, suppose that all of the columns can satisfy the visible usability targets associated with "Minimum," i.e., each column is between the range of widths associated with "Minimum" and "Ideal." For example, if the table width is 15, each of the columns will have the "Minimum" width of 1. Then, the increment for a given column is the difference between the width of the table and the sum of the "Minimum" widths (i.e., 15−5, or 10) divided by the "Minimum Span" values (i.e., 50) times the "Minimum Span" of the given column. Thus, for column A the increment is (10/50)×10, or 2, and the resulting width for column A is 1+2, or 3. Similarly, for column B the increment is 2, and the resulting width for column B is 3; for column C the increment is 1, and the resulting width for column C is 2; for column D the increment is 1, and the resulting width for column D is 2; and for column E the increment is 4, and the resulting width for column E is 5.

Alternatively, if the table width is 25, then the "Minimum" width for each of the columns is 1. Furthermore, the increment for a given column is the difference between the width of the table and the sum of the "Minimum" widths (i.e., 25−5, or 20) divided by the "Minimum Span" values (i.e., 50) times the "Minimun Span" of the given column. Thus, for column A the increment is (20/50)×10, or 4, and the resulting width for column A is 1+4, or 5. Similarly, for column B the increment is 4, and the resulting width for column B is 5; for column C the increment is 2, and the resulting width for column C is 3; for column D the increment is 2, and the resulting width for column D is 3; and for column E the increment is 8, and the resulting width for column E is 9.

In another example, suppose that all of the columns can satisfy the visible usability targets associated with "Ideal," i.e., each column is between the range of widths associated with "Ideal" and "Activated Ideal." Thus, if the table width is 63, each of the columns will have their maximum "Ideal" widths, i.e., column A will have a minimum width of 11, column B will have a minimum width of 11, column C will have a minimum width of 6, column D will have a minimum width of 6, and column E will have a minimum width of 21. Then, the increment for a given column is the difference between the width of the table and the sum of the "Ideal" widths (i.e., 63−55, or 8) divided by the sum of the "Ideal Span" values (i.e., 12) times the "Ideal Span" of the given column. Consequently, for column A the increment is (8/12)× 0, or 0, and the resulting width for column A is 11+0, or 11. Similarly, for column B the increment is 2, and the resulting width for column B is 13; for column C the increment is 2, and the resulting width for column C is 8; for column D the increment is 0, and the resulting width for column D is 6; and for column E the increment is 4, and the resulting width for column E is 25.

In yet another example, suppose that all of the columns can satisfy the visible usability targets associated with "Activated Ideal," i.e., each column is between the range of widths associated with "Activated Ideal" and "Maximum." Thus, if the table width is 73, each of the columns will have their maximum "Activated Ideal" widths, i.e., column A will have a minimum width of 11, column B will have a minimum width of 14, column C will have a minimum width of 9, column D will have a minimum width of 6, and column E will have a minimum width of 27. Then, the increment for a given column is the difference between the width of the table and the sum of the "Activated Ideal" widths (i.e., 73−67, or 6) divided by the "Maximum" span (i.e., 18) times the span of the given column. Consequently, for column A the increment is (6/18)× 0, or 0, and the resulting width for column A is 11+0, or 11. Similarly, for column B the increment is 1, and the resulting width for column B is 15; for column C the increment is 3, and the resulting width for column C is 12; for column D the increment is 1, and the resulting width for column D is 7; and for column E the increment is 1, and the resulting width for column E is 28. Table 2 provides pseudo-code with operation in method 100 (FIG. 1) and 200 (FIG. 2) is some embodiments of the disclosure.

TABLE 2

```
// Compute visual usability targets for each target kind
for the set of columns;
For each visual usability target:
    Set totalTarget to 0;
    For each column in the set of columns:
        Set maxTarget to 0;.
        For each row in a set of rows:
            Locate the cell for a given row and column;
            Compute the visual usability target for that cell;
            Set maxTarget to the maximum of maxTarget and the
                visual usability target for the cell;
        Record maxTarget as the target kind value for the given
column;
        Add maxTarget to totalTarget;
```

TABLE 2-continued

Record totalTarget as the total value for the current target kind;
Given a table size that is constrained to be at least as large as the
total value of a first visual
    usability target and no larger than the total value of a last visual
    usability target, find a pair of visual usability targets whose total
    values encompass the table size as being greater than or equal to
    the smaller of the two target values and being less than the larger
    of the two target values;
Set delta to the difference between the table size and the total value
    of the smaller visual usability target;
Set span to the difference between the total values of the larger and
    the smaller visual usability targets;
Set ratio to delta divided by the span;
For each column in the set of columns:
    Set columnSpan to the difference between the larger and the
        smaller target values for the columns;
    Set columnDelta to the rounded product of the columnSpan and the ratio;
    Set columnMin to be the smaller target value for the visual usability
        target for a given column;
    Set the width of the given column to be the sum of columnMin and
    columnDelta.

We now describe embodiments of a computer system that determines column sizes in a table. FIG. 4 presents a block diagram illustrating a computer system 400 that performs method 100 (FIG. 1) and/or 200 (FIG. 2).

Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: circuit-design module 430 (or a set of instructions), graphics module 432 (or a set of instructions) and/or allocation module 434. Note that one or more of these program modules (or sets of instructions) may constitute a computer-program mechanism.

During operation, a user may use circuit-design module 430 to design or test one or more circuit designs 436. Furthermore, allocation module 434 may dynamically determine column sizes 438 of columns in one or more tables 440, such as table A 442-1 and table B 442-2, based at least on one or more sizes 444 of the one or more tables 440 and sequential groups of size targets 446. Then, graphics module 432 may display the one or more tables 440 on display 416.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Computer system 400 may include a variety of devices, such as: a personal computer, a laptop computer, a server, a work station, a mainframe computer, and/or other device capable of manipulating computer-readable data.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of computer system 400 may be distributed over a large number of servers or computers, with various groups of the servers or computers performing particular subsets of the functions. Consequently, computer system 400 may be at one location or may be distributed across multiple locations, such as computing systems that communicate via a network (such as the Internet or an intranet).

In some embodiments, some or all of the functionality of computer system 400 may be implemented in one or more: application-specific integrated circuit (ASICs), field-programmable gate array (FPGAs), and/or one or more digital signal processors (DSPs). Note that the functionality of computer system 400 may be implemented more in hardware and less in software, or less in hardware and more in software, as is known in the art.

Figure 5:
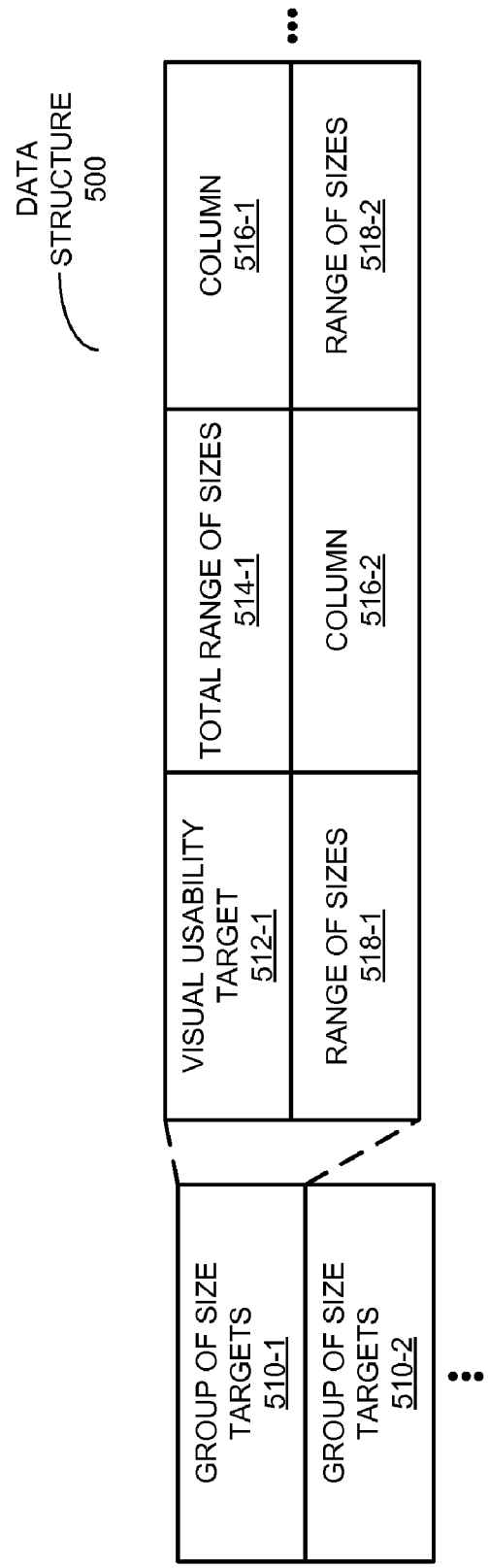
FIG. 5 is a block diagram illustrating a data structure for use in conjunction with the computer system of FIG. 4 in accordance with an embodiment of the present disclosure.

We now discuss embodiments of data structures that may be used in computer system 400. FIG. 5 presents a block diagram illustrating a data structure 500. This data structure may include one or more groups of size targets 510, which may be included in an ordered sequence of groups of size targets. For example, group of size targets 510-1 may include: a visual usability target 512-1; a total range of sizes 514-1 of the group of size targets 510-1; and/or pairs of columns and associated spans or ranges of sizes, such column 516-1 and range of sizes 518-1.

In some embodiments, computer system 400 (FIG. 4) and/or data structure 500 include fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method for determining column sizes in a table, comprising:
    receiving a set of columns in the table and a size of the table in a direction;
    receiving sequential groups of size targets that correspond to visual usability targets for the set of columns, wherein a given group of size targets includes ranges of sizes of the set of columns based at least on the visual usability targets for the set of columns, and wherein a given size target in a given group of size targets includes a given range of sizes of a given column in the set of columns;
    using a processor to determine minimum sizes that correspond to the set of columns based at least on the size of the table and the sequential groups of size targets, wherein the minimum sizes are maximum values in the ranges of sizes of one or more of the groups in the sequential groups of size targets for which the set of columns satisfy the associated visual usability targets; and for a subsequent group of size targets in the sequential groups of size targets after the one or more groups, calculating increments to the minimum sizes of the sets of columns based at least on the range of sizes of the subsequent group of size targets, the size of the table and the minimum sizes, thereby allocating the size of the table across the set of columns.

2. The computer-implemented method of claim 1, wherein the direction is a horizontal direction and the size of the table is a width.

3. The computer-implemented method of claim 1, wherein the direction is a vertical direction and the size of the table is a height.

4. The computer-implemented method of claim 1, wherein the size of the table is specified by a user.

5. The computer-implemented method of claim 4, wherein, if the user modifies the size of the table, the method further includes dynamically repeating the determining of the minimum sizes and the calculating of the increments.

6. The computer-implemented method of claim 1, wherein an increment for the given column corresponds to the given range of sizes times a ratio of a first difference to a second difference;

wherein the second difference is between a sum of the maximum values in the range of sizes of a current group of size targets and a sum of the minimum sizes in the range of sizes of the subsequent group of size targets; and wherein the first difference is between the size of the table and a sum of the minimum sizes of the set of columns.

7. The computer-implemented method of claim 1, wherein a range of sizes of the set of columns in a group of size targets that is between two immediately adjacent groups of sizes targets in the sequential groups of size targets ensures that cells in the set of columns that are within a statistical criterion achieve an associated visual usability target of a subsequent group of size targets.

8. The computer-implemented method of claim 7, wherein the statistical criterion corresponds to a standard deviation of the range of sizes of the set of columns in the group of size targets.

9. The computer-implemented method of claim 1, wherein cells in the columns include textual objects or graphical objects.

10. The computer-implemented method of claim 1, the method further comprising:
receiving a user instruction to expand the given column;
increasing a size of the given column beyond an initial size, which equals a sum of a minimum size and an increment for the given column, based at least on a maximum value in a range of sizes of the given column in the subsequent group of size targets; and
decreasing the sizes of remaining columns in the set of columns from their initial sizes, which equal a sum of the minimum sizes and the corresponding increments for the remaining columns, based at least on the increase in the size of the given column.

11. The computer-implemented method of claim 10, wherein the decrease in the sizes of the remaining columns is further based on the range of sizes of the remaining columns in a prior group of size targets.

12. The computer-implemented method of claim 10, wherein the user instruction includes one or more mouse clicks performed in or proximate to the given column.

13. The computer-implemented method of claim 10, wherein the size of the given column after the increase equals the maximum in the range of sizes of the given column in the subsequent group of size targets.

14. The computer-implemented method of claim 10, the method further comprising:
receiving another user instruction to restore the initial size of the given column;
decreasing the size of the given column back to the initial size; and
increasing the sizes of remaining columns in the set of columns back to their initial sizes.

15. The computer-implemented method of claim 14, wherein the other user instruction to restore the initial size includes one or more mouse clicks performed in or proximate to the given column.

16. The computer-implemented method of claim 1, the method further comprising:
receiving a user instruction to modify a size of the given column from an initial size, which equals a sum of a minimum size and an increment for the given column;
receiving a new size of the table from the user; and
dynamically resizing the columns in the table based at least on initial sizes of the columns, which equal a sum of the minimum sizes and the corresponding increments for the columns, the new size of the table, the sequential groups of size targets, and the modified size of the given column.

17. A computer-program product for use in conjunction with a computer system, the computer-program product comprising a computer-readable storage medium and a computer-program mechanism embedded therein for determining column sizes in a table, comprising:
instructions for receiving a set of columns in the table and a size of the table in a direction;
instructions for receiving sequential groups of size targets that are associated with visual usability targets for the set of columns, wherein a given group of size targets includes ranges of sizes of the set of columns based at least on the visual usability targets for the set of columns, and wherein a given size target in a given group of size targets includes a given range of sizes of a given column in the set of columns;
instructions for determining minimum sizes of the set of columns based at least on the size of the table and the sequential groups of size targets, wherein the minimum sizes are maximum values in the ranges of sizes of one or more of the groups in the sequential groups of size targets for which the set of columns satisfy the associated visual usability targets; and
for a subsequent group of size targets in the sequential groups of size targets after the one or more groups, instructions for calculating increments to the minimum sizes of the sets of columns based at least on the range of sizes of the subsequent group of size targets, the size of the table and the minimum sizes, thereby allocating the size of the table across the set of columns.

18. The computer-program product of claim 17, wherein the computer-program mechanism further includes instructions for dynamically repeating the determining of the minimum sizes and the calculating of the increments if a user modifies the size of the table or a column.

19. The computer-program product of claim 17, wherein an increment for the given column corresponds to the given range of sizes times a ratio of a first difference to a second difference;
- wherein the second difference is between a sum of the maximum values in the range of sizes of a current group of size targets and a sum of the minimum sizes in the range of sizes of the subsequent group of size targets; and
- wherein the first difference is between the size of the table and a sum of the minimum sizes of the set of columns.

20. The computer-program product of claim 17, wherein a range of sizes corresponding to the set of columns in a group of size targets that is between two immediately adjacent groups of sizes targets in the sequential groups of size targets ensures that cells in the set of columns that are within a statistical criterion achieve an associated visual usability target of a subsequent adjacent group of size targets.

21. The computer-program product of claim 17, wherein the computer-program mechanism further includes:
- instructions for receiving a user instruction to expand the given column;
- instructions for increasing a size of the given column beyond an initial size, which equals a sum of a minimum size and an increment for the given column, based at least on a maximum value in a range of sizes of the given column in the subsequent group of size targets; and
- instructions for decreasing the sizes of remaining columns in the set of columns from their initial sizes, which equal a sum of the minimum sizes and the corresponding increments for the remaining columns, based at least on the increase in the size of the given column.

22. The computer-program product of claim 21, wherein the computer-program mechanism further includes:
- instructions for receiving another user instruction to restore the initial size of the given column;
- instructions for decreasing the size of the given column back to the initial size; and
- instructions for increasing the sizes of remaining columns in the set of columns back to their initial sizes.

23. The computer-program product of claim 17, wherein the computer-program mechanism further includes:
- instructions for receiving a user instruction to modify a size of the given column from an initial size, which equals a sum of a minimum size and an increment for the given column;
- instructions for receiving a new size of the table from the user; and
- instructions for dynamically resizing the columns in the table based at least on initial sizes of the columns, which equal a sum of the minimum sizes and the corresponding increments for the columns, the new size of the table, the sequential groups of size targets, and the modified size of the given column.

24. A computer system, comprising:
- a processor;
- memory; and
- a program module, wherein the program module is stored in the memory and configured to be executed by the processor to determine column sizes in a table, the program module including:
  - instructions for receiving a set of columns in the table and a size of the table in a direction;
  - instructions for receiving sequential groups of size targets that are associated with visual usability targets for the set of columns, wherein a given group of size targets includes ranges of sizes of the set of columns based at least on the visual usability targets for the set of columns, and wherein a given size target in a given group of size targets includes a given range of sizes of a given column in the set of columns;
  - instructions for determining minimum sizes of the set of columns based at least on the size of the table and the sequential groups of size targets, wherein the minimum sizes are maximum values in the ranges of sizes of one or more of the groups in the sequential groups of size targets for which the set of columns satisfy the associated visual usability targets; and
  - for a subsequent group of size targets in the sequential groups of size targets after the one or more groups, instructions for calculating increments to the minimum sizes of the sets of columns based at least on the range of sizes of the subsequent group of size targets, the size of the table and the minimum sizes, thereby allocating the size of the table across the set of columns.

* * * * *